United States Patent Office 2,727,905
Patented Dec. 20, 1955

2,727,905

STEROID ALKALI-METAL ENOLATES

Alan H. Nathan and John A. Hogg, Kalamazoo Township, Kalamazoo County, Mich., assignors to The Upjohn Company, Kalamazoo, Mich., a corporation of Michigan No Drawing. Application August 21, 1952,
Serial No. 305,706

15 Claims. (Cl. 260—397.1)

The present invention relates to certain steroid enols and metal enolates thereof and is more particularly concerned with 21-alkoxyoxalyl-progesterones, alkali-metal enolates thereof, and with a process for the production thereof.

An object of the present invention is to provide novel 21-alkoxyoxalyl-progesterones and the alkali-metal enolates thereof. Another object of the present invention is the provision of a process for the production of 21-alkoxyoxalyl-progesterone and alkali-metal enolates thereof. A further object of the present invention is the provision of a process for the production of 21-alkoxyoxalyl-progesterone and alkali-metal enolates thereof without the concomitant formation of alkoxyoxalyl-alkali-metal enolates at other positions of the molecule, which in the case of an α-β unsaturated keto group are to be expected. For example, the tendency of carbon atom two in the case of $\Delta^4$ 3-ketosteroids to glyoxylate has long been known (British Patent 518,571; Ruzicka and Plattner, Helv. Chim. Acta, 21, 1717 (1938); Plattner and Jampolsky, Helv. Chim. Acta, 24, 1457 (1941)), but does not occur to an appreciable extent in the process of the present invention. Other objects of the present invention will be apparent to those skilled in the art to which this invention pertains.

The novel compounds of the present invention may be represented by the following structural formula:

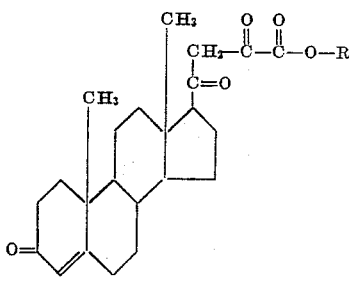

wherein R is alkyl, and alkali-metal enolates thereof, represented by the following formula:

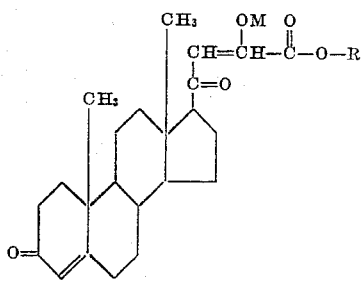

wherein R is alkyl and wherein M is an alkali metal.

The novel process of the present invention involves condensation of progesterone with an alkyl di-ester of oxalic acid in the presence of an alkali-metal alkoxide to produce a 21-alkoxyoxalyl-progesterone alkali-metal enolate, which is productive of the free enol by treatment with a dilute acid.

The novel compounds of the present invention have utility as stable forms of the corresponding keto acids, keeping well, as convenient solids, for long periods of storage. Their water solubility makes these compounds readily adaptable for further syntheses to reactions employing aqueous media. The corresponding enols, the glyoxalic acid which can readily be obtained by hydrolysis with methanolic potassium hydroxide as shown in Example 1A, and the alkali-metal enolates themselves, have utility as intermediates in the preparation of physiologically active compounds, such as 11-desoxycorticosterone acetate (Example 1B), Kendall's compound A (11-dehydrocorticosterone) and corticosterone.

Kendall's compound A, for example, is obtained by converting 11-desoxycorticosterone acetate by a biosynthesis (Murray and Peterson, U. S. Patent 2,602,769) into 11α,21-dihydroxy-progesterone, followed by selective esterification of the 21-hydroxyl group, oxidation with chromic acid of the 11-hydroxyl group and hydrolysis of the ester. Corticosterone can be obtained by a direct biooxidation of the 11-desoxycorticosterone acetate [Colingsworth et al., J. Am. Chem. Soc., 74, 2381 (1952)].

The novel compounds of the present invention which are of particular interest are those compounds having the above generic formula wherein R is lower-alkyl, such as, for example, methyl, ethyl, propyl, isopropyl, butyl, amyl, hexyl, heptyl, octyl, and the like, with methyl and ethyl being preferred, and the alkali-metal enolates thereof.

In carrying out the process of the present invention, progesterone is dissolved in the alkanol corresponding to the alkanol used in the formation of the selected ester of oxalic acid, or in a solvent which is non-reactive under the conditions of the reaction, such as, for example, benzene or ether, and admixed with a solution formed by the reaction of an alkali metal such as, for example, sodium, with the same alkanol. When potassium is used, it is usually used as the solution formed by its reaction with tertiary butyl alcohol according to procedure well known in the art. The desired ester of oxalic acid is admixed with the reaction mixture and the resulting mixture allowed to stand at a temperature between about zero degrees centigrade and the boiling point of the solvent, preferably at room temperature, for a period between about one-half hour and about ninety-six hours. The thus-formed alkali-metal enolate may then be precipitated by the addition of a large volume of an organic solvent, in which the alkali-metal enolate is insoluble, such as ether, for example. The thus-recovered alkali-metal enolate is usually obtained as an amorphous solid, and is a stable form of the corresponding ester. Alternatively, it may be used, without isolation, as an intermediate in the synthesis of the corresponding 21-glyoxalic acid, or as an intermediate for the introduction of a 21-hydroxy or acyloxy group into progesterone as described in Procedures A and B of Example 1, or as the free enol by treatment of the alkali-metal enolate with a dilute acid such as hydrochloric acid, sulfuric acid or the like, as described in Procedure C of Example 1.

The following examples are given to illustrate the products and process of the present invention and are not to be construed as limiting.

*Example 1.—Sodium enolate of 21-ethoxyoxalyl-progesterone*

A mixture of 0.59 gram (0.011 mole) of dry sodium methoxide, twenty milliliters of anhydrous benzene and 2.7 milliliters (0.02 mole) of ethyl oxalate was stirred until a clear solution was obtained. One milliliter of absolute alcohol was then added thereto, followed by a rapid addition of a solution of 3.16 grams (0.010 mole)

of progesterone in 75 milliliters of anhydrous benzene. The mixture was stirred for two hours at room temperature, then 250 milliliters of dry ether was added and the mixture was stirred for an additional 45 minutes. The ivory colored sodium enolate of 21-ethoxyoxalyl-progesterone thus precipitated was collected on a filter, washed with anhydrous ether and dried in a vacuum desiccator at reduced pressure. A quantitative yield was obtained. The presence of a sodium enolate in the structure was verified by the extreme solubility of the product in water and by a positive ferric chloride test for enols as exhibited by the formation of a bright red color when the product was dissolved in aqueous and alcoholic solutions of ferric chloride. The theoretical structure was further verified by infrared and ultraviolet absorption spectra.

A. 21-GLYOXALIC ACID OF PROGESTERONE

Five hundred milligrams of the sodium enolate of 21-ethoxyoxalyl-progesterone, obtained above, was dissolved in a solution of seventy milligrams of potassium hydroxide in fifteen milliliters of a solution composed of equal parts of water and alcohol, whereafter the whole was heated for fifteen minutes on a steam bath. The cooled solution was then filtered and upon acidification there was slowly deposited a crystalline precipitate of the 21-glyoxalic acid of progesterone. Infrared analysis of said compound in solution (chloroform) verified the theoretical structure.

B. 21-ACETOXYPROGESTERONE

To a solution of 1.96 grams (0.004 mole) of the sodium salt of 21-ethoxyoxalyl-progesterone dissolved in 25 milliliters of methanol and cooled in an ice-bath was added dropwise, with stirring, over a period of approximately one hour, a solution of 1.05 grams (0.004 mole) of iodine dissolved in forty milliliters of methanol while maintaining the reaction temperature between minus fifteen and minus twenty degrees centigrade. The reaction mixture thus produced was stirred for eighty minutes at a temperature of about minus fifteen degrees centigrade whereafter 1.2 milliliters of a 3.4 N methanolic sodium methoxide solution was added thereto. Stirring was continued at zero degrees centigrade for one hour and the thus-produced 21-iodoprogesterone was precipitated by the dropwise addition of 150 milliliters of water to the reaction mixture while maintaining the temperature of the reaction mixture at zero degrees centigrade for the hour required to complete the addition. Twenty grams of sodium chloride was then dissolved in the reaction mixture and the product filtered, washed with water, and dried in a vacuum desiccator. The thus isolated 21-iodoprogesterone was converted without further purification to 21-acetoxyprogesterone as shown below.

To a freshly prepared mixture composed of twenty grams of potassium bicarbonate, twelve grams of glacial acetic acid and ten milliliters of acetone was added the 21-iodoprogesterone obtained above dissolved in 100 milliliters of acetone. The mixture was heated under refluxing conditions for one hour, whereafter the mixture was kept at room temperature for 2.5 days. The inorganic solids were removed by filtration and washed with 25 milliliters of acetone. The filtrate and wash were combined and the acetone removed by evaporation. The residue was extracted with three fifty-milliliter portions of warm ethyl acetate which were then combined, washed with a dilute sodium thiosulfate solution and water, and finally dried over anhydrous sodium sulfate. The dry ethyl acetate was distilled in vacuo and the residue was dissolved in a small portion of benzene and chromatographed. Infrared analysis confirmed the structure of the 21-acetoxyprogesterone thus obtained.

C. 21-ETHOXYOXALYL-PROGESTERONE

Five hundred milligrams of the sodium enolate of 21-ethoxyoxalyl-progesterone were dissolved and suspended in twenty milliliters of water. Ten milliliters of ten percent hydrochloric acid were added and the precipitate which separated collected on filter paper, washed with water and dried in a vacuum desiccator over Drierite (anhydrous calcium sulfate). Infrared analysis confirmed the structure of the 21-ethoxyoxalyl-progesterone.

Example 2.—Sodium enolate of 21-methoxyoxalyl-progesterone

Using essentially the procedure described in Example 1, progesterone is converted to the sodium enolate of 21-methoxyoxalyl-progesterone by reaction with methyl oxalate and sodium in absolute methanol. The resulting sodium enolate is converted, as with the 21-ethoxyoxalyl compound, to the 21-glyoxalic acid of progesterone, 21-acetoxyprogesterone and 21-methoxyoxalyl-progesterone according to the procedure of Examples 1A, 1B and 1C.

Example 3.—Potassium enolate of 21-ethoxyoxalyl-progesterone

Using essentially the procedure described in Example 1, progesterone is converted to the potassium enolate of 21-ethoxyoxalyl-progesterone by reaction with ethyl oxalate and potassium in tertiary butyl alcohol. The resulting potassium enolate is converted, as with the corresponding sodium enolate, to the 21-glyoxalic acid of progesterone, 21-acetoxyprogesterone and 21-ethoxyoxalyl-progesterone according to the procedure of Examples 1A, 1B and 1C.

Example 4.—Sodium enolate of 21-isopropoxyoxalyl-progesterone

Using essentially the procedure described in Example 1, progesterone is converted to the sodium enolate of 21-isopropoxyoxalyl-progesterone by reaction with isopropyl oxalate and sodium amide in benzene.

In a manner substantially identical with that of Examples 1 through 4, the following compounds are prepared by reaction of progesterone with the appropriate alkyl oxalate and sodium or potassium alkoxide in an alkanol or non-reactive solvent medium: sodium enolate of 21-propoxyoxalyl-progesterone, sodium enolate of 21-butoxyoxalyl-progesterone, sodium enolate of 21-amyloxyoxalyl-progesterone, the sodium enolate of 21-hexyloxyoxalyl-progesterone, the sodium enolate of 21-heptyloxyoxalyl-progesterone, the sodium enolate of 21-octyloxyoxalyl-progesterone, the potassium analogues of these and like compounds, and the free enols of the foregoing and like compounds.

It is to be understood that the invention is not to be limited to the exact details or exact compounds shown and described, as obvious modifications and equivalents will be apparent to one skilled in the art, and the invention is therefore to be limited only by the scope of the appended claims.

We claim:

1. A process for the preparation of 21-alkoxyoxalyl-progesterone alkali-metal enolate which includes the step of mixing progesterone with a solution of an alkali metal in an alkanol and an alkyl di-ester of oxalic acid wherein the alkyl radicals of the alkanol and the alkyl di-ester of oxalic acid contain from one to eight carbon atoms, inclusive, at a temperature between about zero degrees centigrade and the boiling point of the reaction mixture, to produce the desired 21-alkoxyoxalyl-progesterone alkali-metal enolate.

2. The process of claim 1 wherein the amount of alkali-metal base employed is about one molar equivalent, calculated on the progesterone.

3. A process for the preparation of 21-alkoxyoxalyl-progesterone alkali-metal enolate which includes the step of mixing progesterone with a solution of an alkali metal in an alkanol and an alkyl di-ester of oxalic acid wherein the alkyl radicals of the alkanol and the alkyl di-ester of oxalic acid contain from one to eight carbon atoms, inclusive, continuing the reaction at a temperature between about zero degrees centigrade and the boiling point of the reaction mixture for a period of between about one-half and ninety-six hours, and separating the thus-produced 21-alkoxyoxalyl-progesterone alkali-metal enolate.

4. A process for the preparation of the sodium enolate of 21-ethoxyoxalyl-progesterone which includes the step of mixing progesterone with a solution of sodium in benzene and diethyl oxylate and continuing the reaction at a temperature between about room temperature and the boiling point of the reaction mixture for a period of between about one-half and ninety-six hours and separating the thus-produced sodium enolate of 21-ethoxyoxalyl-progesterone.

5. The process of claim 4 wherein the amount of alkali-metal base employed is about one molar equivalent, calculated on the progesterone.

6. A process for the preparation of the sodium enolate of 21-methoxyoxalyl-progesterone which includes the step of mixing progesterone with a solution of sodium methoxide, methanol and dimethyl oxylate and continuing the reaction at a temperature between about room temperature and the boiling point of the reaction mixture for a period of between about one-half and ninety-six hours and separating the thus-produced sodium enolate of 21-methoxyoxalyl-progesterone.

7. A process for the preparation of the potassium enolate of 21-ethoxyoxalyl-progesterone which includes the step of mixing progesterone with a solution of potassium in tertiary butyl alcohol and diethyl oxylate and allowing the reaction mixture to stand at a temperature between about room temperature and the boiling point of the reaction mixture for a period of between about one-half and ninety-six hours and separating the thus-produced potassium enolate of 21-ethoxyoxalyl-progesterone.

8. A compound selected from the group consisting of 21-alkoxyoxalyl-progesterone, represented by the following formula:

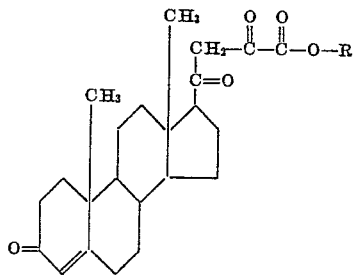

wherein R is lower-alkyl and alkali-metal enolate thereof, represented by the following formula:

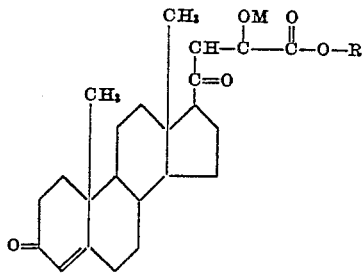

wherein M is an alkali-metal and wherein R is lower-alkyl.

9. The sodium enolate of 21-alkoxyoxalyl-progesterone, represented by the following formula:

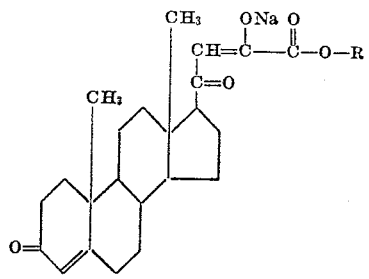

wherein R is lower-alkyl.

10. The potassium enolate of 21-alkoxyoxalyl-progesterone, represented by the following formula:

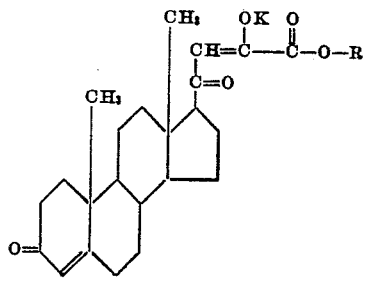

wherein R is lower-alkyl.

11. The sodium enolate of 21-methoxyoxalyl-progesterone.

12. The sodium enolate of 21-ethoxyoxalyl-progesterone.

13. The potassium enolate of 21-ethoxyoxalyl-progesterone.

14. 21-ethoxyoxalyl-progesterone.

15. The sodium enolate of 21-isopropoxyoxalyl-progesterone.

References Cited in the file of this patent

UNITED STATES PATENTS

| 2,265,417 | Bockmuhl | Dec. 9, 1941 |
| 2,554,473 | Ruschig | May 22, 1951 |

FOREIGN PATENTS

| 891,441 | France | 1944 |